(12) United States Patent
Blanchard

(10) Patent No.: US 7,004,298 B2
(45) Date of Patent: Feb. 28, 2006

(54) CONE CLUTCH MECHANISM

(75) Inventor: Robert Blanchard, Le Boupere (FR)

(73) Assignee: France Reducteurs S.A., Les Herbiers (FR)

(*) Notice: Subject to any disclaimer, the term of this patent is extended or adjusted under 35 U.S.C. 154(b) by 0 days.

(21) Appl. No.: 11/013,792

(22) Filed: Dec. 17, 2004

(65) Prior Publication Data
US 2005/0098406 A1 May 12, 2005

Related U.S. Application Data

(62) Division of application No. 10/425,667, filed on Apr. 30, 2003, now Pat. No. 6,863,166.

(30) Foreign Application Priority Data
Apr. 30, 2002 (FR) .................. 02 05404

(51) Int. Cl.
F16D 13/24 (2006.01)
(52) U.S. Cl. ................... 192/66.2; 192/48.8
(58) Field of Classification Search ........... 192/66.2, 192/48.1, 109 R, 110 R, 110 B, 112, 48.8, 192/138, 143
See application file for complete search history.

(56) References Cited

U.S. PATENT DOCUMENTS

| 9,806 A | * | 6/1853 | Knowlson, Jr. ............. 54/18.1 |
| 2,121,075 A | * | 6/1938 | Eason ..................... 192/48.91 |
| 4,314,627 A | | 2/1982 | Nozawa |
| 4,679,681 A | | 7/1987 | Creydt et al. |
| 5,601,000 A | | 2/1997 | Blanchard |
| 5,850,900 A | | 12/1998 | Takahashi et al. |
| 2003/0045398 A1 | * | 3/2003 | Blanchard ................. 477/107 |
| 2004/0200316 A1 | * | 10/2004 | Blanchard ................. 74/810.1 |

* cited by examiner

Primary Examiner—Saul Rodriguez
(74) Attorney, Agent, or Firm—Young & Thompson

(57) ABSTRACT

A clutch mechanism of the type constituted by a toothed wheel (3) driven by an endless screw (12), this wheel (3) being securable to a driven shaft (15) via two friction cones (5) disposed coaxially to the axial bore of the toothed wheel (3), and coacting, under the action of a control device (7, 13), with conical contact areas on the wheel (3). The toothed wheel (3) is made of a synthetic material, the bore of this toothed wheel (3) having an annular partition (16) delimiting on each side a shouldered recess for the reception of a metallic ring (4) secured in rotation to the wheel (3), this ring (4) comprising internally a conical contact area (4A) adapted to coact with the metallic friction cone (5).

6 Claims, 2 Drawing Sheets

CONE CLUTCH MECHANISM

This application is a division of application Ser. No. 10/425,667, now U.S. Pat. No. 6,863,166, filed on Apr. 30, 2003, the entire contents of which are hereby incorporated by reference.

The present invention relates to a clutch mechanism of the type generally disposed in a casing and constituted by a toothed wheel driven by an endless screw, this wheel being securable to a driven shaft by means of two friction cones disposed coaxially to the axial bore of the toothed wheel, and coacting, under the action of a control device, with conical contact areas of the wheel.

Gear transmissions of the toothed crown and endless screw type are well known to those skilled in this art. The toothed crown is a monolithic member, most often of bronze, provided or not with a clutch device permitting coupling this crown to a driven shaft. There has however been noted, in the course of time, wear by abrasion of this toothed crown, giving rise to the formation of metallic particles which disperse in the assembly of the mechanism and cause damage both to the clutch system and to the carrying shaft and its roller bearings. This drawback could be overcome by providing a monobloc crown or toothed wheel of which all the elements were made of steel. But this would result in a prohibitive cost of the toothed wheel because of the multiplicity of machinings of such a monobloc piece.

An object of the present invention is thus to provide a clutch mechanism of the mentioned type whose design permits overcoming all the wear observed in the case of monolithic bronze toothed wheels, whilst maintaining an attractive price for the assembly without increasing the time of mounting such a mechanism.

To this end, the invention has for an object a clutch mechanism of the type generally disposed in a casing and constituted by a toothed wheel driven by an endless screw, this wheel being securable to a driven shaft by means of two friction cones disposed coaxially to the axial bore of the toothed wheel and coacting, under the action of a control device, with conical contact areas of the wheel, characterized in that the toothed wheel is made of a synthetic material, particularly by injection molding, the bore of this toothed wheel having an annular partition delimiting on each side a shouldered recess for the reception of a metallic ring, preferably of steel, secured in rotation with said wheel, this ring comprising internally a conical contact area adapted to coact with the metallic friction cone.

Figure 1:
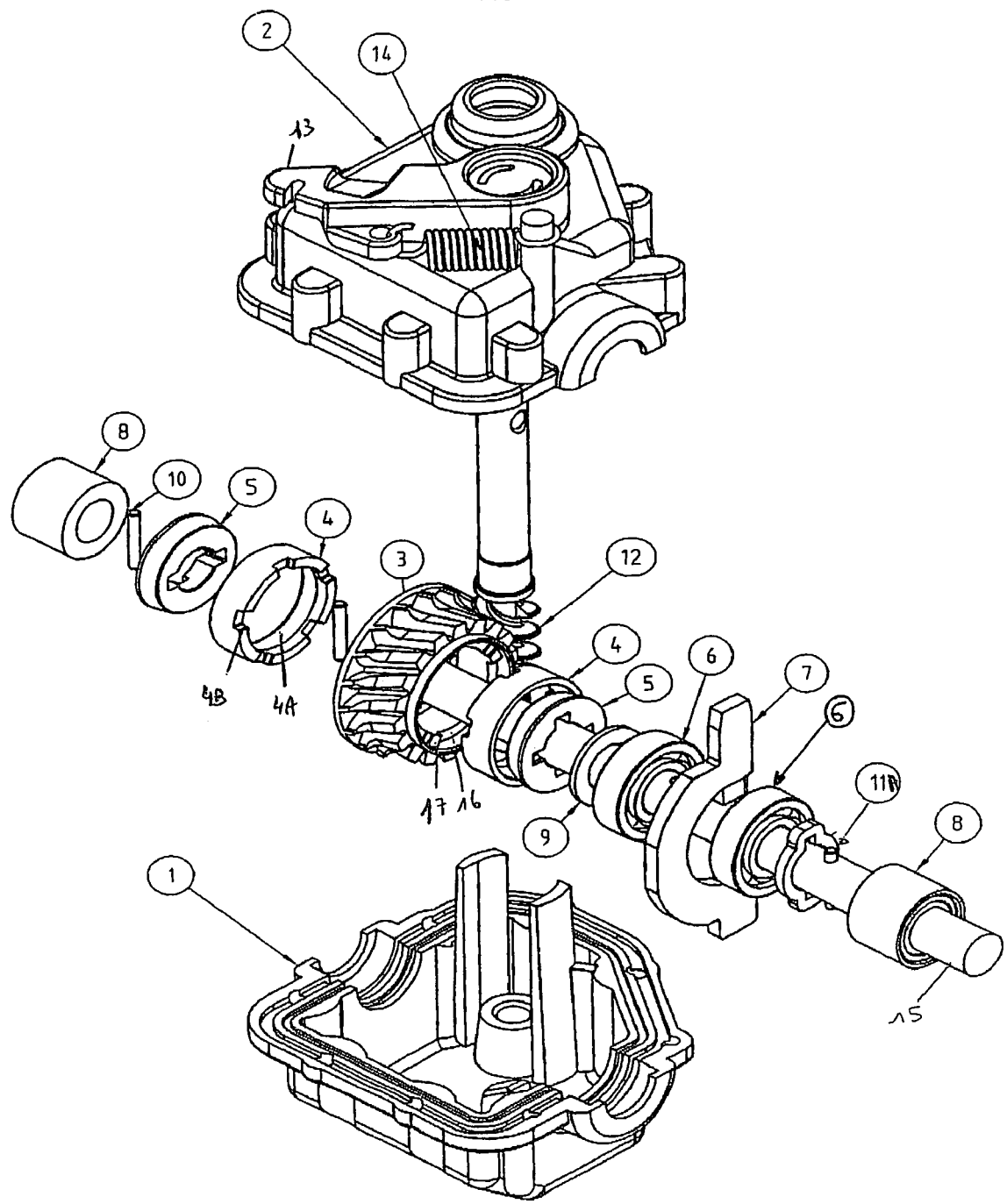
Figure 2:
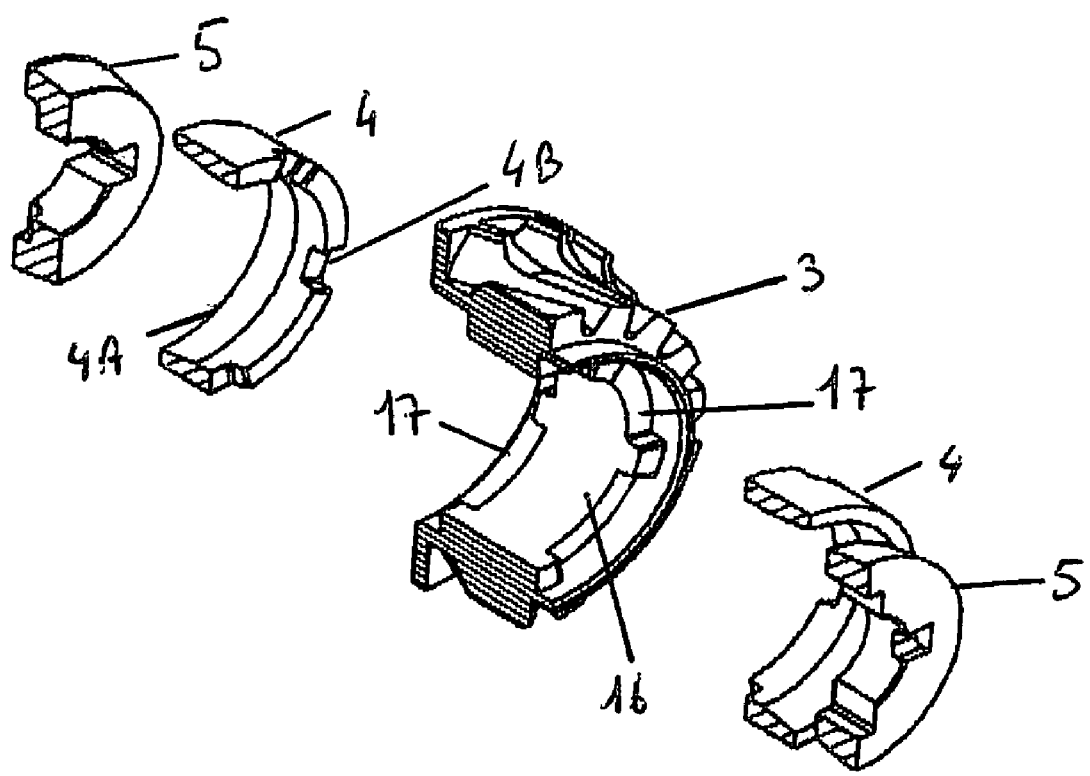

The invention will be better understood from a reading of the following description of embodiments, with reference to the accompanying drawings, in which:

FIG. 1 is a schematic perspective view of a clutch mechanism according to the invention in exploded condition of the constituent elements, and FIG. 2 is a fragmentary exploded view of the constituent elements of the clutch mechanism.

As mentioned above, the clutch mechanism according to the invention is generally disposed in a casing constituted, in the illustrated example, by two half shells 1 and 2 made of a synthetic material and assembled along a joint plane. This clutch mechanism is constituted by a tangent toothed wheel 3 driven by an endless screw 12. This toothed wheel 3 is mounted coaxially of a drive shaft 15, such as the output drive shaft of the front wheels of an automotive machine such as a lawnmower. This wheel 3 is securable to the driven shaft 15 by means of two friction cones 5 disposed coaxially to the axial bore of the toothed wheel 3. These friction cones 5 coact, under the influence of a control device 7, 13, with conical contact areas of the toothed wheel 3 constitute a so-called cone clutch mechanism. Characteristically of the invention, the toothed wheel 3 is made of a synthetic material, particularly by injection molding. The bore of this toothed wheel 3 has a continuous or discontinuous annular partition 16 as shown in FIG. 2. This annular partition 16 delimits on each side a shouldered recess for the reception of a metallic ring 4, preferably of steel, secured in rotation to the toothed wheel 3 but mounted freely axially in at least one direction within this toothed wheel 3. This ring 4 comprises internally a conical contact area 4A adapted to coact with the metallic friction cone 5.

In the illustrated example, the metallic ring 4 is fixed in rotation with the toothed wheel 3 by means of notches 17 made by molding and provided in the recess of the bore of the toothed wheel 3. To this end, the portions of the annular partition 16 adapted to come into opposition with the introduction surface of a ring 4 are crenelated. These notches 17 coact with corresponding notches 4B disposed on the introduction surface of the ring 4 into its recess. This introduction surface constitutes in an analogous manner a crenelated surface. As a result, there is a simplified mounting of the assembly. Thus, the metallic ring 4 is, for its mounting, simply disposed encased by complementary geometrical shaped coaction, in the recess of the bore of the toothed wheel 3. No supplemental securement member is necessary to ensure the connection between the toothed wheel 3 and the ring 4. Only a coaction of the male and female geometric shapes provided on the introduction surface of the ring 4 and the facing portion of the partition 16, is necessary.

As shown in FIG. 1, the toothed wheel 3 is thus provided with two rings 4 disposed on opposite sides of the annular partition 16 of the toothed wheel 3. In this position, each metallic ring 4 projects at least partially outside of the bore of the toothed wheel 3. The conical contact area 4A of each ring 4 is adapted to coact with a friction cone 5. To facilitate this coaction, the rings 4 are of steel, whilst the friction cones 5 are of quenched steel. These friction cones 5 are rendered secure in rotation with the driven shaft 15 by means of pins.

Moreover, to avoid any deformation of the casing 1, 2 that carries the driven shaft 15, there is provided, on the driven shaft 15, stop means 10, 11A disposed on opposite sides of the friction cones 5. These stop means constitute axial abutments defining an interval of a maximum fixed length adapted to resist the forces applied by means of the device 7, 13 for controlling the friction cones 5 of the clutch in the clutching phase and thus to support the casing 1, 2 that carries the driven shaft 15 against all forces thanks to a field of application of the forces in a closed circuit. The device 7, 13 for controlling the cone clutch mechanism is thus constituted by a member 7 angularly displaceable about an axis substantially perpendicular to the axis of the driven shaft 15 to ensure engagement or unengagement of the friction cones 5 and the conical contact areas 4A. This control member 7 is constituted by at least one spacer disposed in the space defined by said stop means 10, 11A between an axially movable friction cone 5 and a stop means 11A. The angular movement of this member 7 is controlled by means of a clutch lever 13 disposed on one of the surfaces of the casing, this lever 13 being returned to unclutched position by a spring 14.

To improve the construction, there is provided, on opposite sides of the spacer, a rolling member 6. There is also provided, between the axially movable friction cone 5 and one of the rolling members 6, a partition ring 9. In the illustrated example, each stop means, shown at 11A and 10 in the figures, is constituted by a pin mounted on the driven shaft 15. Finally, there is provided, on opposite sides of these stop means, bearings 8 carrying the driven shaft 15 and facilitating its disposal within the casing 1, 2.

The operation of such a clutch mechanism is as follows: during angular displacement of the control member 7 in the direction of pressing in the direction of the friction cones 5, the friction cones 5 are moved within the rings 4 to come into contact with the conical contact areas 4A. The permanent rotation movement of the toothed wheel 3 driven by the endless screw 12 is thus transmitted by means of the conical bearing area connection 4A—friction cone 5, to the driven shaft 15, which itself can cause driving of the advancing wheels of a self-propelled rolling engine such as a lawnmower, these wheels being disposed for example at each of the ends of this shaft 15. The clutch mechanism described above is however free from any wear connected with the formation of particles. Such a mechanism is particularly simple to mount because the assembly of the pieces can be engaged on the driven shaft, the metallic rings 4 requiring no supplemental connection member to be able to be secured in rotation to the toothed wheel 3.

What is claimed is:

1. Clutch mechanism disposed in a casing (1, 2) and constituted by a toothed wheel (3) driven by an endless screw (12), this wheel (3) being securable to a driven shaft (15) by means of two friction cones (5) disposed coaxially to the axial bore of the toothed wheel (3), and coacting, under the action of a control device (7, 13), with conical contact areas on the wheel (3), and provided, on the driven shaft (15), stop means (10, 11A) disposed on opposite sides of the friction cones (5) to constitute axial abutments defining an interval of maximum fixed length adapted to resist the forces applied by means of the control device (7, 13) to the friction cones (5) of the clutch in the clutching phase and thus to support the casing (1, 2) that carries the driven shaft (15) against all forces thanks to a field of application of the forces in a closed circuit.

2. Clutch mechanism according to claim 1, characterized in that the control device (7, 13) is constituted by a control member (7) movable angularly about an axis substantially perpendicular to the axis of the driven shaft (15) to ensure the engagement or the unengagement of the friction cones (5) and the conical contact areas (4A), this control member (7) being constituted by at least one spacer disposed in the interval defined by said stop means (10, 11A) between an axially movable one of said friction cones (5) and a part of said stop means (11A).

3. Clutch mechanism according to claim 2, further comprising, on opposite sides of the spacer, a rolling member (6).

4. Clutch mechanism according to claim 3, further comprising, between the axially movable friction cone (5) and one of the rolling member (6), a partition ring (9).

5. Clutch mechanism, comprising:
a casing (1, 2) carrying a drive shaft (15);
a toothed wheel (3) driven by an endless screw (12);
a control device (7, 13);
the toothed wheel (3) secured to the drive shaft (15) by two friction cones (5) disposed coaxially to an axial bore of the toothed wheel (3), and coacting, under action of the control device (7, 13), with conical contact areas on the toothed wheel (3); and
stop means (10, 11A) provided on the driven shaft (15), the stop means (10, 11A) disposed on opposite sides of the friction cones (5) to constitute axial abutments defining an interval of maximum fixed length adapted to resist forces applied by the control device (7, 13) to the friction cones (5) in the clutching phase and thus prevent any bearing against walls of the casing that carries the drive shaft (15).

6. (new) Clutch mechanism, comprising:
a drive shaft (15) carried by a casing;
a toothed wheel (3) mounted coaxially of the drive shaft (15);
an endless screw (12) driving the toothed wheel;
a control device (7, 13);
two friction cones (5) securing the toothed wheel (3) to the drive shaft (15), the two friction cones (5) disposed coaxially to an axial bore of the toothed wheel (3), the two friction cones (5) coacting, under influence of the control device (7, 13), with conical contact areas of the toothed wheel (3) constituting a cone clutch mechanism; and
stop means (10, 11A) provided on the driven shaft (15), the stop means disposed on opposite sides of the friction cones (5), the stop means constituting axial abutments defining an interval of a maximum fixed length adapted to resist the forces applied by the control device (7, 13) to the friction cones (5) in the clutching phase and thus to support the casing (1, 2) and prevent any bearing against the walls of the casing.

* * * * *